March 5, 1957 — R. TRIPMACHER ET AL — 2,783,990
TILTING MELTING FURNACE
Filed Nov. 24, 1953 — 2 Sheets-Sheet 1

Inventors:
Richard Tripmacher
Karl Leupold
By Cushman, Darby & Cushman
attorneys United States Patent Office 2,783,990
Patented Mar. 5, 1957

2,783,990

TILTING MELTING FURNACE

Richard Tripmacher and Karl Leupold, Dusseldorf-Heerdt, Germany

Application November 24, 1953, Serial No. 394,154

5 Claims. (Cl. 266—33)

The invention relates to a melting furnace, carried so that it can be rocked or tilted about a central axis towards both sides, in particular for the melting of shavings and waste of light metal and light metal alloys.

A method is known of bringing the waste material which is to be fed into the melting furnace into a fore chamber for the purpose of rapid melting and good utilization of heat, this fore chamber being in communication with the melting chamber and liquid metal being circulated continuously through it from the melting chamber by means of a pump. By such a circulation of the liquid metal through the freshly charged material to be melted the high heat content of the liquid metal is transferred directly to the fresh material to be melted so that, with a suitable speed of circulation of the liquid metal through the fore chamber the excess heat of the melting chamber, which is heated continuously, is utilized economically and a rapid melting of the material follows.

Such a circulation of the molten metal by means of pumps requires however not only a continuous supervision of the metal circulating pumps, but also everlasting repair of them, since even with the most careful construction they are strongly attacked by the hot metal and have to be changed frequently. This results, not only in high operating costs, but also in frequent interruptions of the operation.

Now the object of the invention is to bring about the melting of the material by means of circulation of the molten metal, without the use of circulating pumps. According to the invention this object is attained by the melting furnace being carried so that it can be rocked or tilted about a central axis to both sides and a feed chamber for the material, in communication with the molten metal, being arranged substantially in the axis of swinging.

By a rocking or oscillating movement of the melting furnace, preferably to both sides at regular intervals, the hot liquid metal washes through the material, freshly brought into the feed chamber and submerged under the surface of the molten metal, from both sides and thereby quickly melts it.

In order to attain a positive washing through of the feed chamber during the rocking movement, according to the invention further the feed chamber is arranged so that it divides the melting furnace into two melting chambers and is only connected with the two melting chambers by two connecting openings, or alternatively the division is made by a separating wall connected with the feed chamber. By the use of such a separating wall the feed chamber can also be arranged outside the actual melting furnace.

The invention is shown in a preferred constructional form in the attached diagrams.

Figure 1:
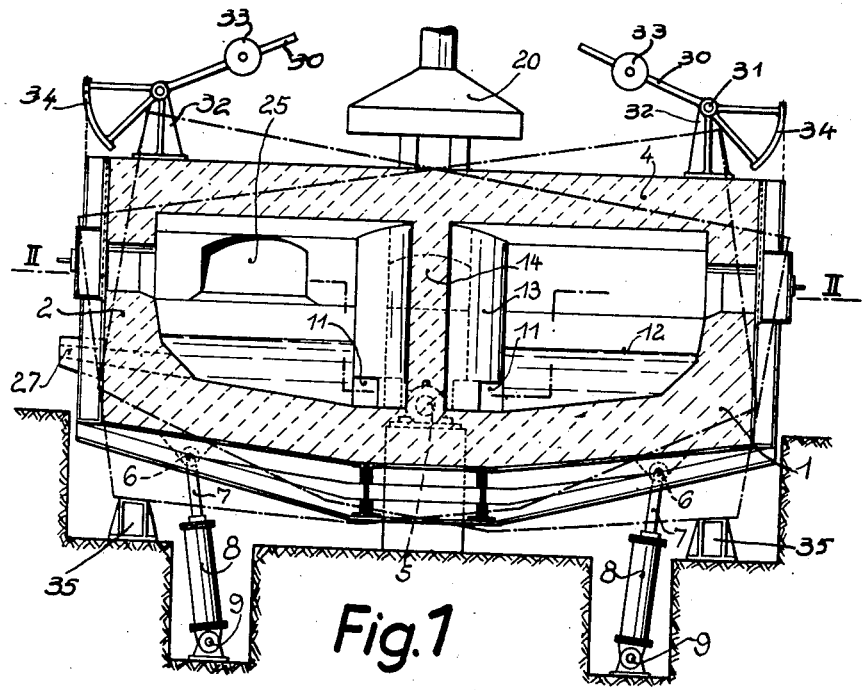
Fig. 1 shows a vertical longitudinal section through a melting furnace constructed according to the invention, on the line I—I of Fig. 2.
Figure 2:
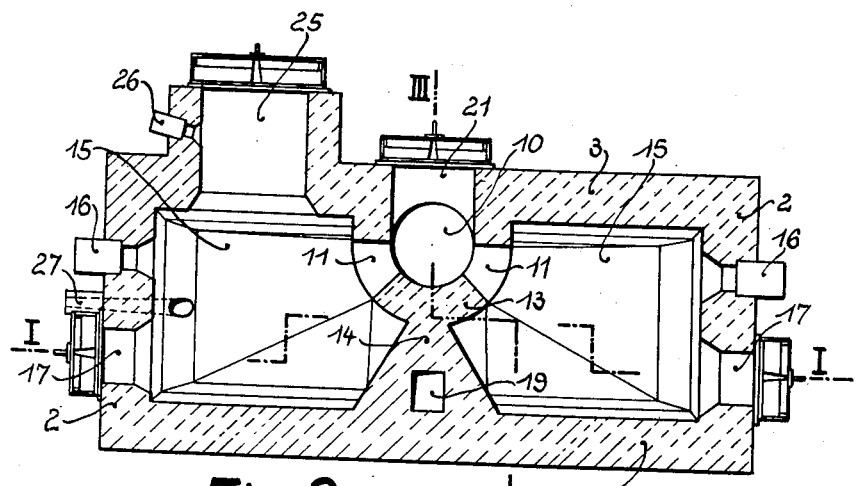
Fig. 2 shows a horizontal section on the line II—II of Fig. 1.
Figure 3:
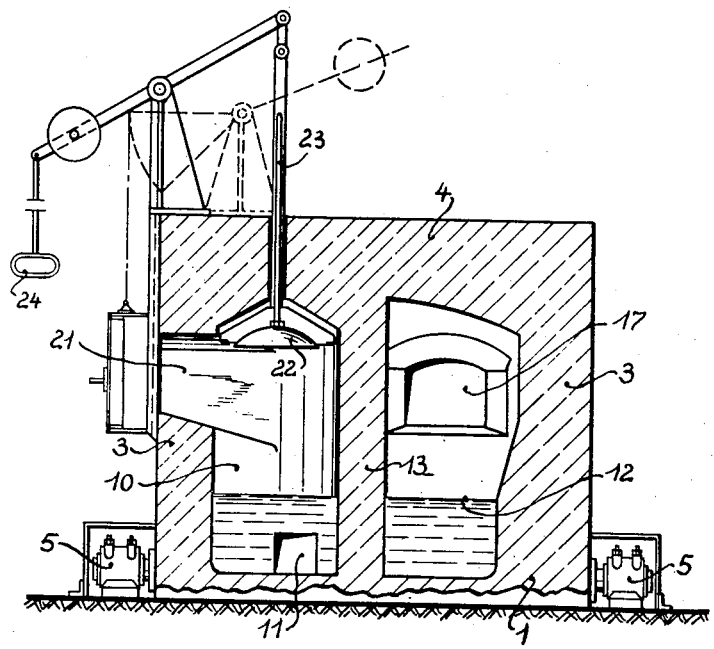
Fig. 3 is a vertical cross section on the line III—III of Fig. 2, on an enlarged scale.

The melting furnace shown in the constructional example is a gas or oil heated melting furnace but may however also be fitted with electrical heating. The molten metal is carried on the floor 1 of the furnace, bordered by the face walls 2 and the side walls 3 and closed at the top by a roof 4. The furnace is carried on both sides in bearings 5 in the lower part in the centre at right angles to the longitudinal axis. Beneath the floor, at both ends, are arranged eyes 6 with which are hinged the piston rods 7 of hydraulically or pneumatically operated pressure devices 8. The other end of the pressure device 8 is hinged at 9.

A vertical feed chamber 10 is disposed in substantially the same plane as the rocking axis of the bearings 5. The feed chamber 10 is closed off from the inside of the melting furnace and only communicates with the fused metal through openings 11 below the level 12 of the fused metal. By means of a separating wall 14, connected with the cylindrical wall 13 of the feed chamber 10 and the other side wall 3 of the furnace, the interior of the furnace is divided into two melting chambers 15. As can be seen immediately, these melting chambers 15 are connected with one another through the openings 11 so that there is the same level of molten metal in the feed chamber 10 as in the chambers 15.

The furnace is heated by burners 16, arranged in the face walls 2, which heat the corresponding melting chambers 15. By means of closeable openings 17 also arranged in the face falls 2 there may be brought on the surface of the molten metal a layer of covering and purifying salts which isolate the molten metal from the combustion gases and prevent it burning. Spaced levers 30 are pivotally mounted as at 31 to brackets 32 on top of the furnace body 1. Adjustable counterweight members 33 are slidably mounted on the lever 30. Each of the levers 30 is also formed with a segmental portion 34 which is operatively connected by any suitable means to a door (not shown) for closing each of the openings 17. The exhaust gases pass through a vertical channel 19 arranged in the separating wall 14 and a widened exhaust hood 20 arranged above the top 4 of the furnace to the chimney.

The material to be melted is supplied to the feed chamber 10 through a closeable opening 21. In the feed chamber 10, above this feed opening, is arranged a dipping device 22 which is connected with a rod 23 passing through the roof of the furnace and is operated by a lever pull 24. After the material to be melted is fed in, the dipping device 22 is lowered so far that the material fed in is pressed under the molten metal.

By the alternate actuation, preferably at regular intervals of time, of the pressure devices 8 the furnace is rocked or tilted in opposite directions, as shown by dot-and-dash lines in Fig. 1. With these rocking movements the molten metal flows from one melting chamber 15 through the openings 11 and the feed chamber 10 into the other melting chamber 15. Thereby the material, freshly brought into the feed chamber 10, is continually washed or preheated by the liquid material kept in the two melting chambers 15 and under the action of the heat of the burners 16, which thereby gives up the necessary heat of melting to the material to be melted. In this way the material fed in is quickly melted without being exposed to direct contact with the hot combustion gases.

The frequency of the rocked or tilted movement is adjusted to the amount of heat necessary for the melting of the material, this being supplied from the heat of the molten metal and independent of the volume of molten metal.

In the one side wall 3 of the furnace there is a further opening 25 through which if necessary there can be fed in waste material which would not go in the feed chamber 10. The feed opening 25 is heated by a burner 26 arranged in the side wall of the opening 25. Spaced stop members 35 may be positioned so as to engage the bottom of the furnace 1 in order to limit the downward rocking movement thereof.

By means of a closeable casting nozzle 27 arranged in the one face wall 2 a part of the molten material is fed into a casting pit, not shown in the diagram, at certain intervals of time, after removal of the sealing and when tipped towards this side.

What we claim is:

1. A furnace for melting metals or the like including a furnace body having at least two spaced melting chambers, a vertically disposed feed chamber between the melting chambers, said body having spaced openings communicating the feed chamber with the melting chambers, said openings being disposed near the bottom of the chambers said melting chambers communicating with one another through said feed chamber so that the molten material in the feed chamber is at the same level as that in the melting chambers, fixed transversely spaced bearing members, said furnace body having outwardly and laterally extending trunnions on opposite sides thereof, said trunnions being rotatably mounted in said bearings to permit longitudinal rocking movement of the furnace, means for heating the melting chambers, and means for imparting rocking movement to the furnace, the parts being constructed and arranged so that as the fresh material is alternately fed from the feed chamber into the melting chambers, the molten material passes from one melting chamber into the other through the feed chamber and into the path of the freshly fed material to constantly mix with the same to preheat the fresh material, and without exposing it to direct contact of the hot combustion gases.

2. A furnace as called for in claim 1 in which a dipping device is mounted on the top of said feed chamber so as to press down the fresh material into the molten metal.

3. A furnace as called for in claim 1 in which means are provided for rocking the furnace body alternately in opposite directions and at regular intervals.

4. A melting furnace as called for in claim 1 in which fluid pressure operating means are operatively connected to the end portions of the furnace body so as to be alternately actuated for rocking the furnace body about the fixed bearing members at regular intervals.

5. A furnace as called for in claim 1 having an auxiliary chamber connected to at least one of the melting chambers, said auxiliary chamber having a supplementary heating device for melting metal blocks and large size material.

References Cited in the file of this patent

UNITED STATES PATENTS

| | | |
|---|---|---|
| 1,032,745 | Dow | July 16, 1912 |
| 1,947,114 | Schmeller | Feb. 13, 1934 |
| 2,035,282 | Schmeller | Mar. 24, 1936 |
| 2,036,902 | Warlimont | Apr. 7, 1936 |
| 2,465,454 | Marsh | Mar. 29, 1949 |
| 2,562,441 | Stroman | July 31, 1951 |
| 2,662,764 | Arutunoff | Dec. 15, 1953 |

FOREIGN PATENTS

| | | |
|---|---|---|
| 650,657 | Germany | Oct. 4, 1937 |
| 670,110 | Germany | Jan. 12, 1939 |